United States Patent Office 2,993,059
Patented July 18, 1961

2,993,059
PURIFICATION OF ALKYLENE OXIDES WITH PERMANGANATE SALTS

Herman A. Bruson, North Haven, and Donald W. Kaiser, Hamden, Conn., assignors to Olin Mathieson Chemical Corporation, New Haven, Conn., a corporation of Virginia
No Drawing. Filed Dec. 30, 1959, Ser. No. 862,755
3 Claims. (Cl. 260—348)

This invention relates to a process for the purification of alkylene oxides and more particularly provides an improved process for the ready obtainment of purified lower alkylene oxide such as ethylene oxide or propylene oxide having a reduced content of chloro-olefins and other impurities. Alkylene oxides prepared by the dehydrochlorination of the corresponding chlorohydrin with lime generally contain some chloro-olefins. Thus propylene oxide prepared by such reactions generally has a content of chlorine-containing impurities believed to consist of 1-, 2-, or 3-chloropropenes or mixtures thereof. Likewise, aldehydic impurities may be present. The chloro-olefins and other impurities are undesirable, even at rather low concentrations, in view of the retarding effect in reactions of the oxide, as in the manufacture of high molecular weight polyglycols. Prior proposals for the elimination of these undesired ingredients, as by fractionation, selective adsorption, bromination, use of ozone, and polymerization, have been inadequate because of insufficient separation or the requirement for expensive steps or reagents, or both. For example, fractional distillation is ineffective when, as is often the case with these impurities the boiling points are close to that of the oxide.

It has been the main object of this invention to provide an effective and economical method of removing chloro-olefin and other contaminants from lower alkylene oxides, particularly propylene oxide.

This object and other related objectives have been accomplished by contacting the crude propylene oxide or other alkylene oxide with a metal salt of permanganic acid, particularly the alkali metal and alkaline earth metal permanganates. Surprisingly, a permanganate such as potassium permanganate is soluble in an alkylene oxide such as propylene oxide, thus facilitating reaction with the undesired impurities. In addition to removing the chloro-olefins efficiently, salts of permanganic acid are also capable of removing the small amounts of carbonyl compound impurities such as aldehydes which frequently occur as contaminants in alkylene oxides. While sodium, potassium, lithium, magnesium or calcium permanganate may be used, potassium permanganate is preferred.

The manufacture of propylene oxide generally involves the reaction of propylene with hypochlorous acid to yield propylene chlorohydrin, which is then treated with calcium hydroxide to yield propylene oxide. This procedure results in the presence of the above-mentioned chloro-olefins and propionaldehyde. The cholor containing impurities may be present to the extent of 0.3% by weight or higher in the propylene oxide. Such concentrations of chloro-olefins must be lowered significantly before the propylene oxide can be used effectively in various types of reactions.

Similar impurities are formed in the conversion of other olefins such as ethylene, butylene, amylene, hexylene, heptene, and octene to oxide through the intermediate chloro-hydrin, and correspondingly, the substantial reduction of the content thereof in the oxide is required.

The treatment in accordance with this invention is effected by maintaining the lower alkylene oxide, preferably containing two to eight carbon atoms, in contact with a small amount of a metal permanganate, maintaining the contact for a period of about a quarter hour to ten or twelve hours, depending on the temperature, and separating the purified oxide, as by distillation.

Preferably, the mixture is stirred at above room temperature, for example, while boiling under reflux at atmospheric pressure. Higher pressures and correspondingly higher reflux temperatures may be advantageous in the case of the highly volatile oxides, such as ethylene oxide and propylene oxide, in shortening the treatment period. A quarter hour treatment period is adequate at temperatures of about 75° to 100° C., while generally, 1 to 2 hours is satisfactory at 30° to 75° C. and about 3 to 5 hours at temperatures of about 20° to 30° C. Longer treatment times will be desirable at temperatures between 0° and 20° C.

The initial pink to purple color of the solution changes during the treatment period, a brownish precipitate of manganese oxide being produced during the reaction. A water suspension of the precipitated manganese oxide was found to be substantially neutral.

Effective reduction of the content of the above-described types of impurities is readily accomplished by the use of about 0.2 to 5 parts by weight of permanganate per 100 parts by weight of alkylene oxide. However, more precise control may be exercised by running small scale experimental treatments using different ratios, thus determining the optimum ratio for use on particular large batches or runs of crude alkylene oxide.

Illustrative embodiments of the invention are described in the following specific examples.

Example 1

A batch of propylene oxide containing 3-chloropropene-1 as an impurity, was found by analysis to contain 0.098% chlorine by weight.

A 200 g. portion of the contaminated propylene oxide was mixed with 1.0 g. of potassium permanganate. The mixture was stirred and distilled through a 7" Claisen head during a period of one hour. During this time, the initial purple solution became altered to suspension containing a dark brown precipitate of manganese oxide. The distilled propylene oxide amounted to 192 g., or 96% recovery. Analysis of the distilled propylene oxide revealed that the chlorine content had been reduced to 0.057%.

Example 2

A 200 g. sample of commercial propylene oxide was stirred with 2 grams of potassium permanganate and boiled under reflux at 34° C. for one hour. During this time, the purple solution changed and a dark brown deposit formed in the flask. The propylene oxide was then distilled. During the distillation, the pot temperature rose from 34° C. to 40° C. The weight of recovered oxide was 192 g. (96% recovery). The chlorine content was reduced by the above procedure from an initial value of 0.011% to 0.0063% by weight.

Example 3

A batch of propylene oxide, containing equal parts of 2- and 3-chloropropenes-1 as impurities, was found to contain 0.07% chlorine by weight.

A 200 g. portion of the contaminated propylene oxide was placed in a flask with 5.0 g. of potassium permanganate. The flask was equipped with a stirrer and an 18" Vigreux column provided with a variable fractionating head. The mixture was refluxed for an hour and then distilled. The distilled propylene oxide was collected in two equal portions of 95 g. each. The first fraction was found to contain 0.0086% chlorine and the second fraction contained 0.0063% chlorine.

The effective removal of chlorine-containing impurities and other impurities from ethylene oxide and related oxides may likewise be effected as described above, by treatment with a permanganate followed by the separation of the oxide, in accordance with the present invention.

We claim:

1. A process for removing chloro-olefins from a lower alkylene oxide containing two to eight carbon atoms comprising contacting the crude alkylene oxide with about 0.2% to 5% of its weight of a metal permanganate at a temperature of about 0° to 100° C., maintaining contact to form a precipitate of manganese oxide, and separating purified alkylene oxide by distillation.

2. A process for removing chloro-olefins from an alkylene oxide containing two to eight carbon atoms comprising contacting the crude alkylene oxide with about 0.2 to 5% of its weight of a metal permanganate, chosen from the group consisting of alkali metal and alkaline earth metal permanganates, at a temperature of about 30° to 75° C. for about 1 to 2 hours, and separating purified alkylene oxide by distillation.

3. A process for purifying propylene oxide contaminated with a chloro-propene comprising contacting the crude propylene oxide with about 0.2 to 5% of its weight of potassium permanganate at a temperature of about 30° to 75° C. for about 1 to hours, and separating purified propylene oxide by distillation.

References Cited in the file of this patent

UNITED STATES PATENTS

| | | |
|---|---|---|
| 2,868,806 | Holzschuh | Jan. 13, 1959 |
| 2,868,807 | Holzschuh | Jan. 13, 1959 |